EMANUEL WEISS, OF BASLE, SWITZERLAND.

Letters Patent No. 85,261, dated December 22, 1868.

IMPROVEMENT IN TREATING CEREALS FOR THE MANUFACTURE OF FLOUR, MEAL, &c.

The Schedule referred to in these Letters Patent and making part of the same.

*To all whom it may concern:*

Be it known that I, EMANUEL WEISS, of Basle, Switzerland, have invented an Improvement in Treating Cereals; and I do hereby declare the following to be a full, clear, and exact description of the same.

My invention consists of an improved method, fully described hereafter, of treating cereals, whereby the nutritious and indigestible portions are perfectly separated.

My invention consists in moistening the grain with an alkaline solution, instead of steeping it in water of various degrees of temperature, as hitherto practised, the solution being applied either before or during the grinding or cleaning of the grain.

The formula of the solution is as follows:

Caustic soda, three hundred and thirty-two grammes; water, six kilogrammes six hundred and sixty-eight grammes, equal to seven kilogrammes, equivalent to nearly seven litres of decorticating liquid, and sufficient to treat one hundred kilogrammes of grain.

The liquid dilates the tissues of the exterior cuticle of the grain, which cuticle swells, and may be easily detached by the least friction.

The principal advantages derived from the substitution of an alkaline solution for water, are—

First, the "testa" of the grain is not affected as it is when grain is steeped for a long time in water.

Second, a prolonged immersion in this liquid will produce only alcoholic fermentation, and not the putrid fermentation resulting when water is employed.

Third, a satisfactory result is produced by treating the grain with the liquid for from fifteen to twenty-five minutes only.

Fourth, all the albuminous nutritious parts are preserved intact, as are also the amylaceous or starchy parts.

Fifth, the grain retains all its albuminous portions, and the bran (which is strictly only the indigestible ligneous pellicle) is absolutely free from gluten, and is thus available for paper-stock, bleaching, and various other purposes.

The meals obtained from grains treated by this process are extremely rich, and if rendered dark in color by an excess of gluten, this defect may be remedied by improved bolting.

I have obtained an excellent result by the addition, to the meals, of small quantities of alum and cooking-salt, and also by employing calcareous water.

The caustic soda may be made (if not otherwise readily obtainable) by boiling, for about two hours, two parts of crude or calcined soda in twelve times its weight in water, and adding a solution of one part of quick-lime in three parts of water.

I claim as my invention, and desire to secure by Letters Patent—

Subjecting cereals to the action of an alkaline solution, substantially as and for the purpose described.

In testimony whereof, I have signed my name to this specification, in the presence of two subscribing witnesses.

EMANUEL WEISS.

Witnesses:
 BIRMAN SOCIN,
 DR. H. CHRIST.